Patented Oct. 2, 1934

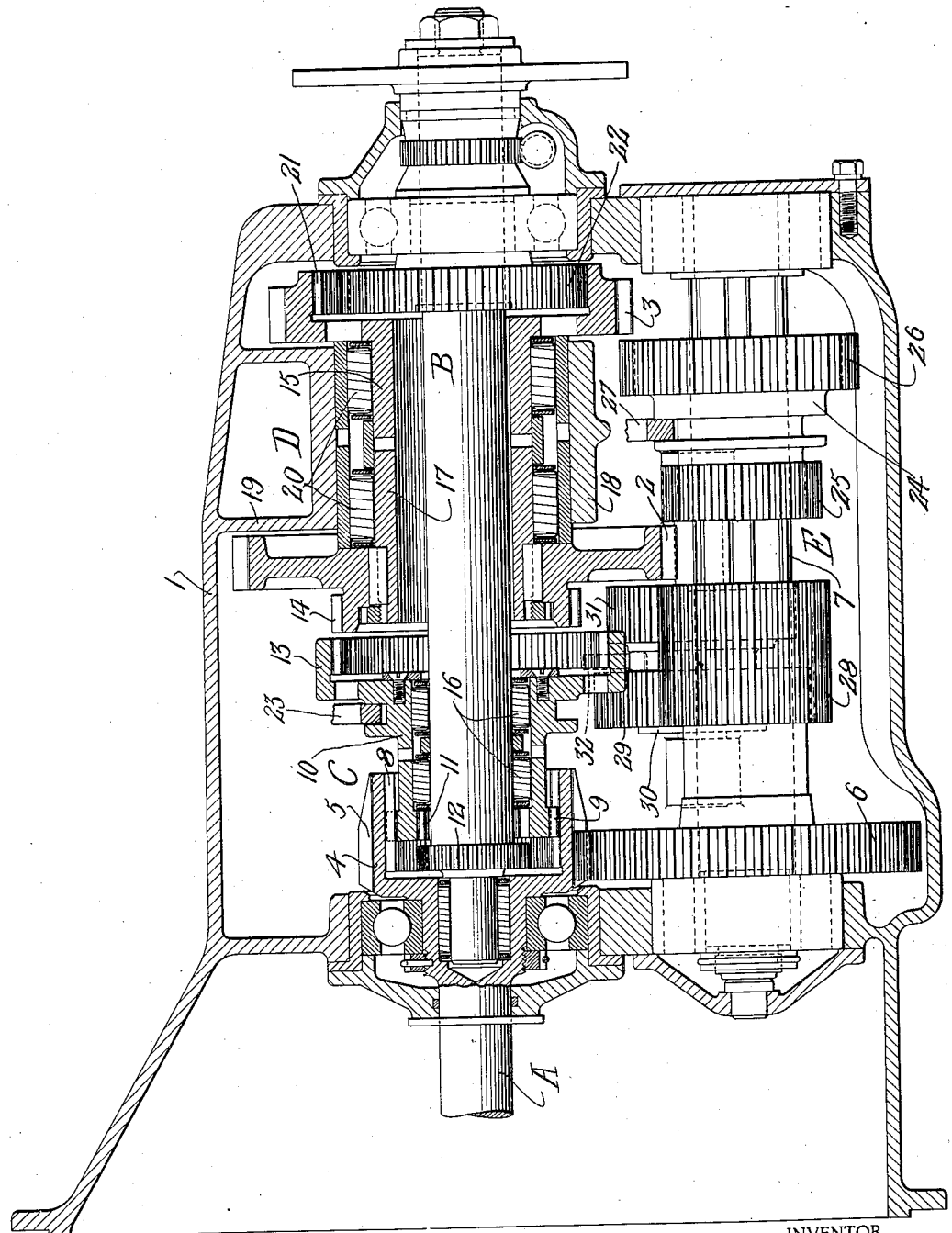

1,975,300

UNITED STATES PATENT OFFICE 1,975,300

GEAR TRANSMISSION

Fred C. Thompson, Detroit, Mich., assignor, by mesne assignments, to Automotive Research Corporation, a corporation of Delaware Application October 6, 1927, Serial No. 224,293
Renewed February 21, 1934

10 Claims. (Cl. 74—58)

This invention relates to improvements in gear transmissions and more particularly to those employing internal external gears.

One of the primary objects of my invention is to make it possible to provide the clutch of such transmissions with anti-friction bearing means without increasing the size and weight of the transmission, particularly of the revolving parts of the gearing.

A more specific object of my invention is to provide an improved, simple and compact arrangement of parts in transmissions of the above character.

How these and other objects and advantages can be secured in connection with the invention will appear from my description hereinafter of the best form of embodiment at present known to me.

The invention is particularly useful in connection with automotive vehicles and it will be described with special reference thereto.

In the drawing—

The figure is a sectional elevation through a transmission device constructed in accordance with my invention.

The gear transmission illustrated in the drawing comprises in general a driving shaft A having a bearing adjacent one end in the gear housing 1, a coaxial driven shaft B having its bearing at one end in the housing 1 and at its other end in the driving shaft, a clutch device C, an internal-external gear set D, and, in this instance, selective gearing E which I have associated with external gear teeth 2 and 3 on the internal-external gear set D so as to be enabled to effect changes in speed in addition to those afforded by the gear set D alone, as will hereinafter fully appear.

The drive shaft A has an enlarged end 4 provided with external gear teeth 5 which are permanently in mesh with the teeth of the external gear 6 of the selective gearing lay shaft 7, and internal splines 8 with which the external splines 9 of the rotatable and axially slidable clutch member 10 cooperate. This clutch member 10 is provided at one end with internal clutch teeth or members 11 adapted to be meshed with the clutch teeth or members 12 on the driven shaft B, and at its other end with an internal gear 13 adapted to be meshed with the external gear 14 of the compound gear 15. The clutch member 11 is rotatably and slidably mounted on the driven shaft by means of the anti-friction bearing or bearings 16.

The compound gear 15 of the internal gear set D comprises a hollow portion or shaft 17 through which the driven shaft B passes, which hollow shaft is mounted in a fixed bearing 18, the axis of which is offset to the axis of the aligned driving and driven shafts A and B. As illustrated an internal bracket 19 in the gear housing 1 carrying the anti-friction bearings 20—20 constitutes the compound gear bearing. The hollow shaft is provided at one end with the external gear 14 hereinbefore mentioned and at its other end with an internal gear 21. The external gears 2 and 3 above mentioned are also carried by the hollow shaft 17. The internal gear 21 is in permanent mesh with the external gear 22 carried by the driven shaft B.

Before going into a detailed description of the selective gear device E, I will first describe the operation of the internal-external gear set D.

With the parts in the position illustrated in the drawing, the transmission device is in neutral position, i. e., there is no drive as between the drive and driven shafts. Assuming, now, that it is desired to increase the speed of the driven shaft over that of the driving shaft, the clutch member 10 is moved to the right to cause the internal gear 13 to mesh with the external gear 14 which, by virtue of the splined connection 8, 9, and the meshing of the gears 13 and 14, increases the speed of the compound gear 15, and as the gear 21 of the compound gear is in mesh with the gear 22 of the driven shaft, the speed of the driven shaft is increased over that of the driving shaft, the increase being the combined increase afforded by the gears 13 and 14 and the gears 21 and 22. With the clutch member 10 in the above position, the clutch teeth 11 are disengaged from the driven shaft clutch teeth 12. Any suitable form of shifter mechanism may be provided for shifting the clutch, as, for example, a lever 23 having a forked end engaging the clutch member 10.

In order to connect the driving and driven shaft for direct drive, the clutch member 10 is moved to the left to unmesh the gears 13 and 14 and to mesh or engage the clutch teeth 11 and 12. Thus the shafts are connected together to rotate as one, the clutch member 10 with its gear 13 running idle.

It is to be noted that in my improved arrangement the clutch parts are grouped at one end of the device whereby I am enabled to conveniently provide the anti-friction bearing or bearings 16 for the rotatable and slidable member of the clutch device C without making it necessary to increase the weight and diameters of the rotating parts of the gear set D as would be the case, for example, were the clutch teeth located at one end of the gear set and the movable gear at the other end, thus necessitating running a connecting member through the bore of the hollow shaft. To attempt to provide such a clutch member with anti-friction bearings would mean that the hollow shaft 17 and the associated gears would have to be considerably increased in diameter with the objectionable results of added weight and prohibitive size. Through the practice of my invention such difficulties are avoided.

Reverting now to the selective gear mechanism E, it will be seen that the lay shaft 7 is rotated by means of the gears 5 and 6, and that it has splined thereon the compound gear 24 comprising an external gear 25 and an external gear 26, which compound gear is slidable from the neutral position shown in the figure to the right or left, as by means of the forked operating lever 27. A fixed gear 28 is also carried by the lay shaft 7, which gear meshes with the gear 29 of the compound reverse idler 30. The other gear 31 of the reverse idler is adapted to be meshed with the external gear teeth 2 when the idler is moved to the right as by means of the forked operating lever 32.

The operation of the device to obtain drive through the medium of the selective gears is as follows. Assuming that it is desired to obtain low or first speed drive, the clutch device C and the reverse idler 30 are placed in their neutral positions and the compound gear 24 is moved to the left to cause mesh between the gear 25 and the external teeth 2 of the compound internal-external gear 15, which effects a reduction in speed as between the drive and driven shafts, the drive being through gears 5, 6, 25, 2, 21 and 22. When second speed is to be obtained, the compound gear 24 is moved to the right to cause mesh between the gear 26 and the external teeth 3 of the compound internal-external gear 15, thus effecting reduced drive through the gears 5, 6, 26, 3, 21 and 22. For direct drive and over-speed drive the compound gear 24 and the reverse idler 30 are placed in neutral and the clutch device C operated as above described. For reverse the compound gear 24 and the clutch device C are placed in neutral and the reverse idler 30 moved to the right to cause mesh between the gear 31 and the external teeth 2 of the compound internal-external gear 15, thus causing the driven shaft to rotate in reverse direction to the driving shaft, the drive being through gears 5, 6, 28, 29, 31, 2, 21 and 22. It is pointed out that the gear 28 is of such length that the gear 29 is in mesh therewith in its neutral as well as in its active position.

In a transmission device of the character described my improved arrangement of parts is very advantageous for the reason that by keeping down the diameters of the hollow lay shaft and associated gears, I am enabled to keep down the overall height of the transmission device.

It is to be understood that while I have described one particular form of selective gearing associated with the internal-external gearing, I contemplate using my device in association with standard gear sets, in which case the shaft B would become the drive shaft of an adjacent gear set. The internal-external gear set may also be employed as a change speed device in itself. I also contemplate employing the gear set D for reduced drive, in which event the driving gear 13 would be an external gear meshing with an internal gear and the gear 21 would be an external gear meshing with an internal gear.

I claim:—

1. A transmission device comprising, in combination, a driving shaft, a driven shaft, gearing associated with said shafts, a gear of said gearing being splined to the drive shaft and axially movable therealong, an anti-friction bearing for said movable gear, said bearing being on the driven shaft, clutch means carried by said movable gear, and clutch means carried by said driven shaft, said movable gear when moved in one direction being adapted to connect the shafts for drive through the medium of the gearing and when moved in another direction to connect the shaft for direct drive through the medium of the clutch means.

2. A transmission device comprising, in combination, a driving shaft having internal splines; an axially movable driving gear having external splines cooperating with the driving shaft splines; clutch members associated with said driving gear; a bearing for said driving gear independent of the driving shaft; a driven shaft having clutch members adapted to cooperate with the driving gear clutch members, and a driven gear mounted thereon; and change speed gearing through the medium of which change of speed is effected as between the drive and driven shafts when said driving gear is moved in one direction, said driving gear when moved in another direction connecting the shafts for direct drive.

3. A transmission device comprising, in combination, a driving shaft having splines; a driven shaft having clutch members and a gear thereon; an axially movable driving gear having splines cooperating with the driving shaft splines and clutch members adapted to cooperate with the driven shaft clutch members; anti-friction bearing means on the driven shaft for the driving gear; one of the aforesaid gears being internal and the other external, and a compound gear mounted on a fixed axis offset from the axes of the driving and driven shafts including internal and external gears adapted for mesh with the aforesaid gears.

4. A transmission device comprising, in combination, a drive shaft, a coaxial driven shaft, a driving gear splined to the drive shaft and rotatable on the driven shaft, a driven gear on said driven shaft, one of said gears being internal and the other external, a compound gear mounted on a fixed axis offset from the axis of said coaxial shaft, said compound gear being located between the driving and driven gears and including an external and internal gear adapted for mesh with the first mentioned internal and external gears respectively, clutch means on the driving gear, and clutch means on said driven shaft, said driving gear being axially movable along the driven shaft for effecting connection of the drive and driven shaft for direct speed or for change speed through the medium of the gearing.

5. A transmission device comprising, in combination, a driving shaft, a driven shaft, internal and external gearing adapted to be drivingly connected to the driving shaft, the driving gear of said gearing having splined connection with the driving shaft and being rotatably mounted on the driven shaft and movable therealong to drivingly connect and disconnect the gearing with said shaft, and means associated with said driving gear for connecting the shafts for direct drive when said gear is disconnected from said gearing.

6. A transmission device comprising, in combination, a driving shaft, a driven shaft, internal and external gearing adapted to be drivingly connected to the driving shaft, the driving gear of said gearing having splined connection with the driving shaft and being rotatably mounted on the driven shaft and movable therealong to drivingly connect and disconnect the gearing with said shaft, and means associated with said driving gear for connecting the shafts for direct drive when said gear is disconnected from said gearing, together with anti-friction bearing means between the driving gear and the driven shaft.

7. A transmission device comprising in combination, a casing, a driving shaft, a bearing in said casing for the driving shaft, a coaxial driven shaft having a bearing at one end in the driving shaft and at the other end in said casing, a driving gear coaxial with said shafts and mounted for rotation and axial movement on the driven shaft, spline means connecting the driving gear and driving shaft, clutch means on the driven shaft, clutch means on the driving gear adapted to cooperate with the driven shaft clutch means, gearing for driving the driven shaft including a gear adapted to be driven by the aforesaid driving gear, means for moving said driving gear axially to a position in which the driving gear is meshed with the gear to be driven thereby to connect the shafts for geared drive and to a position out of mesh with said gear and with the aforesaid clutch means engaged to connect the shafts for direct drive.

8. In a transmission for vehicles, a driving shaft, a driven shaft, means for driving the driven shaft from the drive shaft at the same or unlike speeds including a ring member eccentrically surrounding and geared to said driven shaft, and a gear and clutch member continuously drivingly coupled with the driving shaft and slidable on the driven shaft into gear engagement with said eccentric ring member, and also into clutch engagement with the driven shaft.

9. In a transmission for vehicles, aligned shafts, an eccentrically positioned gear ring, constantly meshing gearing between one shaft and said eccentrically positioned gear ring, said eccentric gear ring having an external gear, and an internal gear splined on the other shaft for movement into engagement with said external gear.

10. In a transmission, aligned shafts, means to directly clutch said shafts, other means to drive one shaft from the other including external teeth on one shaft, a double gear having internal teeth engaging said external teeth and having external teeth in a plane removed from the plane of said internal teeth, and a movable member splined to the other shaft having internal teeth to engage said last mentioned external teeth.

FRED C. THOMPSON.